(12) United States Patent
Kumei et al.

(10) Patent No.: US 10,756,360 B2
(45) Date of Patent: Aug. 25, 2020

(54) FUEL CELL SYSTEM

(71) Applicant: Toyota Jidosha Kabushiki Kaisha, Toyota-shi Aichi-ken (JP)

(72) Inventors: Hideyuki Kumei, Shizuoka-ken (JP); Norihiko Haraikawa, Mishima (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/253,890

(22) Filed: Jan. 22, 2019

(65) Prior Publication Data

US 2019/0229351 A1 Jul. 25, 2019

(30) Foreign Application Priority Data

Jan. 23, 2018 (JP) ................................. 2018-008894
Aug. 27, 2018 (JP) ................................. 2018-158645

(51) Int. Cl.

| H01M 8/04029 | (2016.01) |
| H01M 8/24 | (2016.01) |
| H01M 8/10 | (2016.01) |
| H01M 8/0438 | (2016.01) |
| H01M 8/04044 | (2016.01) |
| H01M 8/04089 | (2016.01) |
| H01M 8/0432 | (2016.01) |
| B01D 19/00 | (2006.01) |

(52) U.S. Cl.
CPC .... *H01M 8/04029* (2013.01); *B01D 19/0063* (2013.01); *H01M 8/0432* (2013.01); *H01M 8/04044* (2013.01); *H01M 8/04089* (2013.01); *H01M 8/04425* (2013.01); *H01M 8/10* (2013.01); *H01M 8/24* (2013.01)

(58) Field of Classification Search
CPC ...................... H01M 8/04029; H01M 8/04044
See application file for complete search history.

(56) References Cited

U.S. PATENT DOCUMENTS

2009/0191437 A1* 7/2009 Maeshima ........ H01M 8/04029
429/434

FOREIGN PATENT DOCUMENTS

| JP | 2005183023 A | 7/2005 |
| JP | 2007265956 A | 10/2007 |
| JP | 2010123270 A | 6/2010 |
| JP | 2014086156 A | 5/2014 |
| JP | 2014186815 A | 10/2014 |

\* cited by examiner

*Primary Examiner* — Ula C Ruddock
*Assistant Examiner* — Armindo Carvalho, Jr.
(74) *Attorney, Agent, or Firm* — Dinsmore & Shohl LLP

(57) ABSTRACT

A fuel cell system comprising: a fuel cell stack including: a stacked body in which unit cells are stacked, the unit cells including first and second unit cells; a reactant gas flow path; and a cooling water flow path; a pump that supplies cooling water to the cooling water flow path; a supply device that supplies reactant gas to the reactant gas flow path; and a control device configured to include: a bubble detection portion configured to detect an accumulation of bubbles in the cooling water flow path; and a cause determination portion configured to determine whether or not the accumulation of bubbles is caused by leakage of the reactant gas from the reactant gas flow path, when the bubble detection portion detects the accumulation of bubbles.

8 Claims, 12 Drawing Sheets

FUEL CELL SYSTEM

CROSS-REFERENCE TO RELATED APPLICATION

This application is based upon and claims the benefit of priority of the prior Japanese Patent Application No. 2018-158645, filed on Aug. 27, 2018, and the prior Japanese Patent Application No. 2018-008894, filed on Jan. 23, 2018, the entire contents of which are incorporated herein by reference.

TECHNICAL FIELD

The present disclosure relates to a fuel cell system.

BACKGROUND

A fuel cell stack includes a stacked body including unit cells stacked. The stacked body is provided with reactant gas flow paths through which reactant gases flow, and a cooling water flow path through which cooling water flows. When bubbles accumulate in the cooling water flow path, the cooling efficiency of the fuel cell stack is lowered, which may degrade power generation efficiency thereof. For solving this problem, in Japanese Unexamined Patent Application Publication No. 2014-86156, the bubbles are discharged from the cooling water flow path by changing the rotating speed of the pump that supplies cooling water to the cooling water flow path.

As described above, when the bubbles accumulate in the cooling water flow path, it is useful to take an appropriate action depending on a cause of the accumulation of bubbles. Conventionally, however, the cause has not been determined.

SUMMARY

It is an object of the present disclosure to provide a fuel cell system determining a cause of accumulation of bubbles in a cooling water flow path of a fuel cell stack.

The above object is achieved by a fuel cell system including: a fuel cell stack including: a stacked body in which unit cells are stacked, the unit cells including first and second unit cells, the first unit cell being located on a first end of the stacked body, the second unit cell being located on a second end of the stacked body, the first unit cell being located above the second unit cell in a gravity direction; a reactant gas flow path formed in the stacked body; and a cooling water flow path formed in the stacked body, and extending from the second end to the first end and extending again to the second end; a pump that supplies cooling water to the cooling water flow path; a supply device that supplies reactant gas to the reactant gas flow path; and a control device configured to include: a bubble detection portion configured to detect an accumulation of bubbles in the cooling water flow path; and a cause determination portion configured to determine whether or not the accumulation of bubbles is caused by leakage of the reactant gas from the reactant gas flow path, when the bubble detection portion detects the accumulation of bubbles.

The fuel cell system may include a removal device configured to remove accumulated bubbles from the cooling water flow path, when it is determined that the accumulation of bubbles is not caused by the leakage of the reactant gas from the reactant gas flow path.

The removal device may include the pump that discharges bubbles from the cooling water flow path by increasing and decreasing a rotating speed of the pump.

The fuel cell system may include a warning device configured to issue a warning when it is determined that the accumulation of bubbles is caused by the leakage of the reactant gas from the reactant gas flow path.

In a state where the pump is stopped and the supply device is supplying the reactant gas to the reactant gas flow path, the cause determination portion may be configured to determine that the accumulation of bubbles is caused by the leakage of the reactant gas from the reactant gas flow path, when an increasing amount of pressure in the cooling water flow path is not less than a predetermined value. In a state where the pump is stopped and the supply device is supplying the reactant gas to the reactant gas flow path, the cause determination portion may be configured to determine that the accumulation of bubbles is caused by the leakage of the reactant gas from the reactant gas flow path, when a decreasing amount of pressure in the reactant gas flow path is not more than a predetermined value.

The cause determination portion may be configured to determine that the accumulation of bubbles is caused by the leakage of the reactant gas from the reactant gas flow path, when the supply device increases a supply amount of reactant gas to the reactant gas flow path, and thus a position of one of the unit cells that has a minimum cell voltage among the unit cells moves down in the gravity direction. The cause determination portion may be configured to determine that the accumulation of bubbles is caused by the leakage of the reactant gas from the reactant gas flow path, when the supply device increases a supply amount of reactant gas to the reactant gas flow path, and thus a position of one of the unit cells that has a highest temperature among the unit cells thus moves down in the gravity direction.

BRIEF DESCRIPTION OF THE DRAWINGS

FIG. 41 is a graph illustrating a temperature of each unit cell in the stacked body in FIG. 4A.

DETAILED DESCRIPTION

Figure 1:
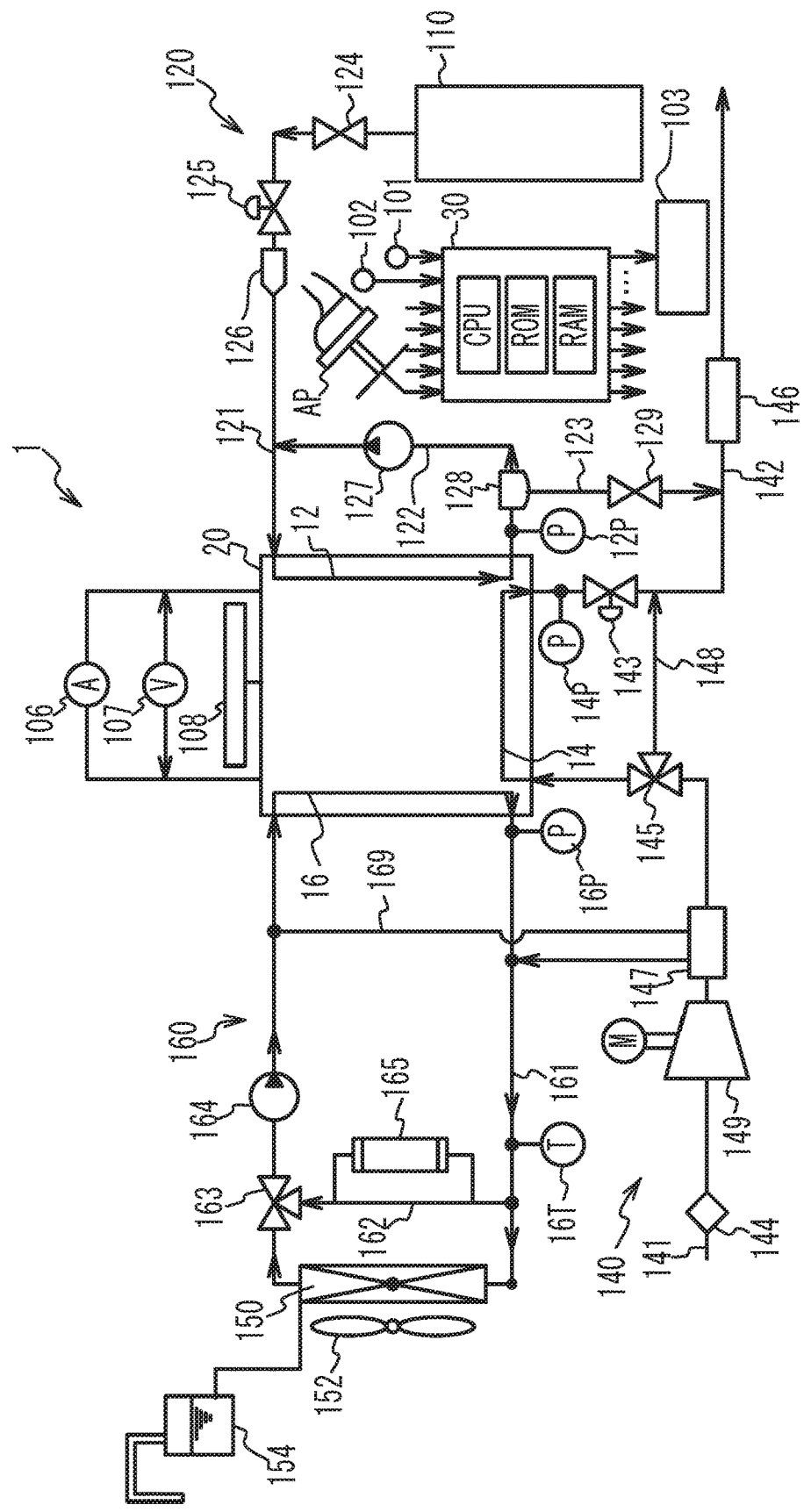
FIG. 1 is an outline of a fuel cell system mounted on a vehicle.

FIG. 1 is an outline of a fuel cell system 1 mounted on a vehicle. The vehicle is a fuel-cell vehicle, an electric vehicle, and a hybrid vehicle, for example. The fuel cell system 1 (hereinafter referred to as the system) can be applied to various moving bodies other than vehicles (for example, vessels, airplanes, and robots) and stationary power sources. The system 1 includes a fuel cell stack (hereinafter referred to as the stack) 20, a control device 30, a hydrogen gas supply system 120, an air supply system 140, and a cooling water supply system 160. The system 1 supplies power generated by the stack 20 to electrical components including a motor for traveling the vehicle.

The control device 30 is a computer that includes a Central Processing Unit (CPU), a Read Only Memory (ROM), and a Random Access Memory (RAM). The control device 30 executes various controls of the system 1 by receiving sensor inputs, which are signals from an ignition switch 101, and an accelerator pedal AP, for example. The ignition switch 101 mounted on the vehicle is electrically connected to the control device 30. Thus, when the ignition switch 101 is turned on, the control device 30 starts the system 1, and when the ignition switch 101 is turned off, the control device 30 stops the system 1. An outside air temperature detected by an outside air temperature sensor 102 is outputted to the control device 30, which will be described later in detail. An HMI device 103 is an example of a warning device that issues a warning to an occupant of the vehicle in a predetermined case, which will be described later in detail. The HMI device 103 includes a warning device that issues a warning, which includes, for example, at least one of a display that can display a warning with an image, or a speaker that can output a warning by a sound.

The stack 20 is of a solid polymer electrolyte type, includes unit cells stacked, and generates power by receiving fuel gas (for example, hydrogen) and oxidant gas (for example, air) as reactant gases. A current and a voltage generated by the stack 20 are respectively detected by a current sensor 106 and a voltage sensor 107. The detection results are outputted to the control device 30. A cell monitor 108 will be described later. The stack 20 includes a fuel gas flow path 12 through which the fuel gas flows, an oxidant gas flow path 14 through which the oxidant gas flows, and a cooling water flow path 16 through which cooling water flows. The stack 20 will be described later in detail.

The hydrogen gas supply system 120 supplies hydrogen to the stack 20 for generating power. More specifically, the hydrogen gas supply system 120 includes a tank 110, a hydrogen supply path 121, a circulation path 122, a discharge path 123, a tank valve 124, a pressure adjusting valve 125, an injection valve 126, a circulation pump 127, a gas-liquid separator 128, a switching valve 129, and a pressure sensor 12P. The hydrogen gas supply system 120 is an example of a supply device that supplies hydrogen gas to the fuel gas flow path 12 of the stack 20.

Hydrogen gas is supplied to the fuel gas flow path 12 of the stack 20 through the hydrogen supply path 121 from the tank 110. The tank valve 124, the pressure adjusting valve 125, and the injection valve 126 are disposed in this order from the upstream side of the hydrogen supply path 121. The circulation path 122 circulates fuel off-gas, which is discharged from the fuel gas flow path 12 of the stack 20 to the hydrogen supply path 121. The supply amount of hydrogen gas is adjusted by the control device 30, which controls opening and closing of the valves on the basis of the operation of the accelerator pedal AP.

The circulation pump 127 and the gas-liquid separator 128 are disposed on the circulation path 122. The circulation pump 127 circulates fuel off-gas, which is separated at the gas-liquid separator 128, to the hydrogen supply path 121. Moisture and a part of fuel off-gas separated in the gas-liquid separator 128 are discharged to a discharge path 142 via the discharge path 123, which are branched from the gas-liquid separator 128, and via the switching valve 129. The pressure sensor 12P is disposed on the circulation path 122 between the outlet of the fuel gas flow path 12 of the stack 20 and the gas-liquid separator 128. The pressure sensor 12P detects the pressure in the fuel gas flow path 12 of the stack 20, that is, the pressure of the fuel gas in the fuel gas flow path 12. The detection result is outputted to the control device 30.

The air supply system 140 supplies air to the stack 20. More specifically, the air supply system 140 includes an air compressor 149, an air supply path 141, the discharge path 142, a bypass valve 145, a muffler 146, an intercooler 147, a bypass route 148, and a pressure sensor 14P. The air supply system 140 is an example of a supply device that supplies the oxidant gas to the oxidant gas flow path 14 of the stack 20.

Air taken from outside via an air cleaner 144 goes through the air supply path 141. The air is compressed by the air compressor 149 and is cooled by the intercooler 147, and is then supplied to the oxidant gas flow path 14 of the stack 20.

The bypass valve 145 is disposed at a branch point where the bypass route 148 is branched from the air supply path 141. The bypass valve 145 adjusts the flow rate of air supplied to the stack 20 and the flow rate of air bypassing the stack 20 via the bypass route 148. The discharge path 142 discharges the oxidant off-gas discharged from the oxidant gas flow path 14 of the stack 20 to the atmosphere. A pressure adjusting valve 143 adjusts the flow rate of the oxidant off-gas and the back pressure on the cathode side. The pressure sensor 14P is disposed on the discharge path 142 between the outlet of the oxidant gas flow path 14 of the stack 20 and the pressure adjusting valve 143. The pressure sensor 14P detects the pressure in the oxidant gas flow path 14 of the stack 20, in other words, the pressure of the oxidant gas in the oxidant gas flow path 14. The detection result is outputted to the control device 30. The amount of air supplied to the stack 20 is also adjusted, as well as that of hydrogen gas, by the control device 30, which controls various devices based on the operation of the accelerator pedal AP. The muffler 146 is disposed on the discharge path 142 and reduces noise caused by air passing through the discharge path 142.

The stack 20 is cooled by the cooling water supply system 160, which circulates the cooling water through a predetermined path. Specifically, the cooling water supply system 160 includes a radiator 150, a fan 152, a reserve tank 154, a circulation path 161, a bypass route 162, a three-way valve 163, an electric pump 164, an ion exchanger 165, a water pressure sensor 16P, a water temperature sensor 16T, and a distribution path 169.

The cooling water pressurized and fed by the pump 164 circulates through the circulation path 161. The cooling water is cooled by exchanging heat at the radiator 150 with air blown by the fan 152. The cooling water cooled as above is supplied to the cooling water flow path 16 of the stack 20, which is then cooled. The water pressure sensor 16P detects the pressure of the cooling water discharged from the cooling water flow path 16 of the stack 20 and flowing through the circulation path 161. The detection result is outputted to the control device 30. Since the water pressure sensor 16P is disposed in the vicinity of the outlet of the cooling water flow path 16 of the stack 20, the water pressure sensor 16P substantially detects the pressure in the cooling water flow path 16. The water temperature sensor 16T detects the temperature of the cooling water discharged from the cooling water flow path 16 of the stack 20 and flowing through the circulation path 161. The water temperature sensor 16T detects the temperature of the cooling water discharged from the stack 20 before flowing into the radiator 150. This temperature of the cooling water is approximately correlated with the temperature of the stack 20. Thus, the water temperature sensor 16T substantially detects the temperature of the stack 20. The bypass route 162 is branched from the circulation path 161, and bypasses the radiator 150. The three-way valve 163 adjusts the flow rate of the cooling water circulating through the bypass route 162. The ion exchanger 165 is disposed on the bypass route 162 so that a part of the cooling water circulating through the bypass route 162 flows into the ion exchanger 165.

The reserve tank 154 is connected to the radiator 150. The reserve tank 154 is an atmospheric open type container that stores the cooling water. Therefore, the pressure in the surface of the cooling water stored in the reserve tank 154 is the atmospheric pressure. Surplus cooling water is stored in the reserve tank 154, which suppresses decrease of the liquid amount of the cooling water that circulates through each path. The reserve tank 154 also functions as a gas-liquid separator that separates bubbles mixed in the cooling water.

The distribution path 169, which is branched from the circulation path 161, is connected to the intercooler 147, and is connected to the circulation path 161 again. Accordingly, the cooling water is supplied to the intercooler 147 via the distribution path 169, and air passing through the intercooler 147 is cooled by this cooling water.

Figure 2:
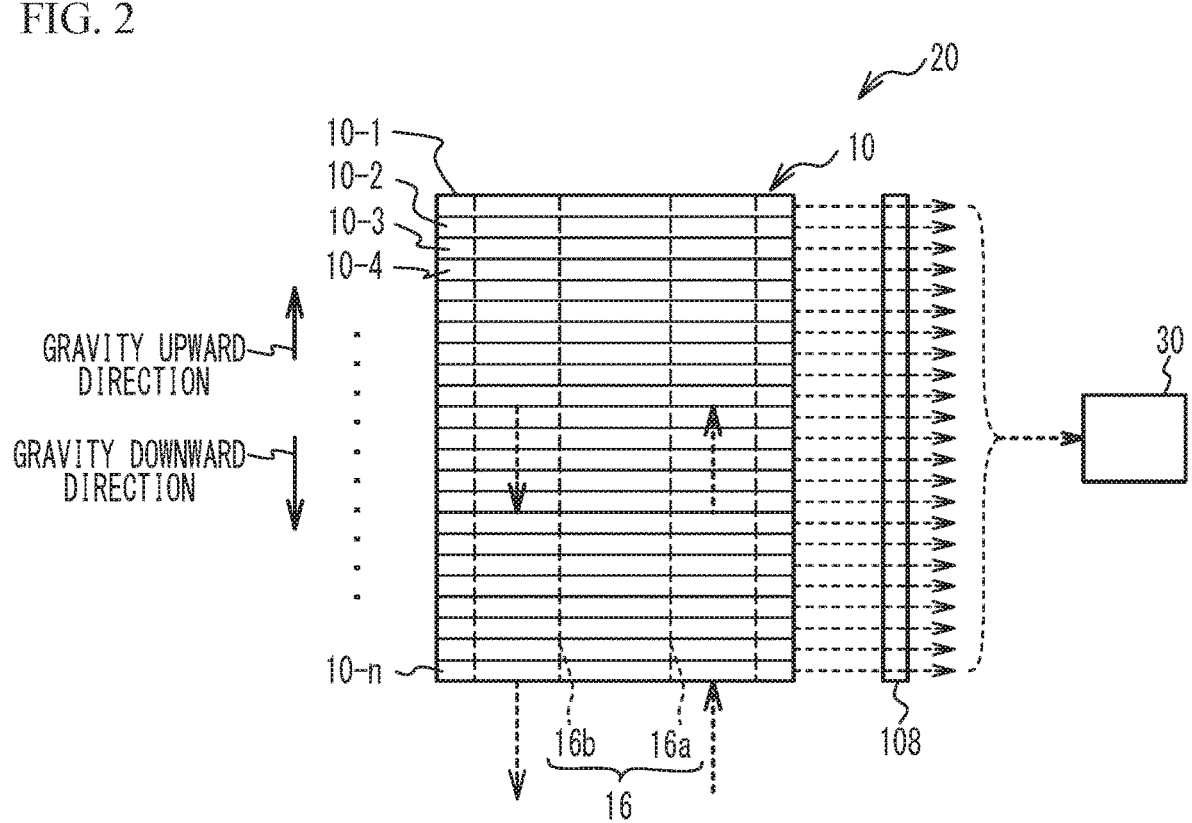
FIG. 2 is a schematic view of a stacked body forming a stack.

FIG. 2 is a schematic view of a stacked body 10 forming the stack 20. Unit cells 10-1, 10-2 . . . 10-n are stacked to form the stacked body 10 where "n" is a positive integer. The unit cells are arranged in a stacking direction that is approximately equal to the gravity direction. In other words, the unit cells are arranged in the stacked body 10 so that the unit cell 10-1 on one end side is located above the unit cell 10-n on the other end side in the gravity direction. The unit cell 10-1 is located on the uppermost side of the stacked body 10 in the gravity direction. The unit cell 10-n is located on the lowermost side of the stacked body 10 in the gravity direction. Each unit cell includes a Membrane Electrode Gas diffusion layer Assembly (MEGA), an insulating member supporting the MEGA, and a pair of separators holding the MEGA and the insulating member. The MEGA includes an electrolyte membrane, catalytic layers respectively formed on both sides of the electrolyte membrane, and a pair of gas diffusion layers respectively joined to the catalytic layers. In addition, although not illustrated, a pair of current-collector boards, a pair of insulating boards, and a pair of end plates are arranged so as to hold the unit cells. The cell monitor 108 detects the cell voltage of each unit cell, and outputs the detection result to the control device 30.

The cooling water flow path 16 as described above is formed in the stacked body 10. The cooling water flow path 16 includes a cooling water supply manifold 16a and a cooling water discharge manifold 16b (hereinafter both described as cooling water manifolds), which penetrate through the stacked body 10 in the stacking direction, and a flow path (not illustrated) defined between separators of the adjacent unit cells. The cooling water manifolds 16a and 16b are formed so as to penetrate through all of the unit cells. Further, the cooling water manifolds 16a and 16b are formed so as to penetrate through the current-collector boards, the insulating boards, and the end plates, which are arranged on the unit cell 10-n side. The cooling water flows into the cooling water manifold 16a from the circulation path 161 as described above, and is discharged from the cooling water manifold 16b via the flow path (not illustrated) to the circulation path 161. In other words, the cooling water flow path 16 formed in the stacked body 10 extends from the unit cell 10-n on the other end side to the unit cell 10-1 on the one end side, and extends again to the unit cell 10-n on the other end side. The cooling water flows in the cooling water flow path 16 formed as above, thereby cooling the unit cells. In this specification, the cooling water flow path 16 formed in the stacked body 10 represents all of the cooling water manifolds 16a and 16b, and the flow path formed between the adjacent unit cells.

The fuel gas flow path 12 of the stack 20 has a structure similar to that of the cooling water flow path 16. The fuel gas flow path 12 includes a fuel gas supply manifold and a fuel gas discharge manifold, which penetrate through the stacked body 10 in the stacking direction, and a flow path (not illustrated) defined between one of the pair of separators and the MEGA of each unit cell. Similarly, the oxidant gas flow path 14 includes an oxidant gas supply manifold and an oxidant gas discharge manifold, which penetrate through the stacked body 10 in the stacking direction, and a flow path (not illustrated) defined between the other of the pair of the separators and the MEGA of each unit cell. With the above, the fuel gas and the oxidant gas are supplied to each unit cell, and then the stack 20 generates power.

The control device 30 executes following controls including: bubble detection processing that detects the accumulation of bubbles in the cooling water flow path 16; cause determination condition confirmation processing that confirms a precondition for executing cause determination processing; determination processing that determines whether or not the leakage exits; bubble discharge processing that discharges the bubbles from the cooling water flow path 16; and bubble discharge inhibition processing that inhibits the bubble discharging processing, all of which processing will be described later in detail. The above all of processing is functionally realized by CPU, ROM, and RAM of the control device 30. A control executed by the control device 30 is now described.

Figure 3:
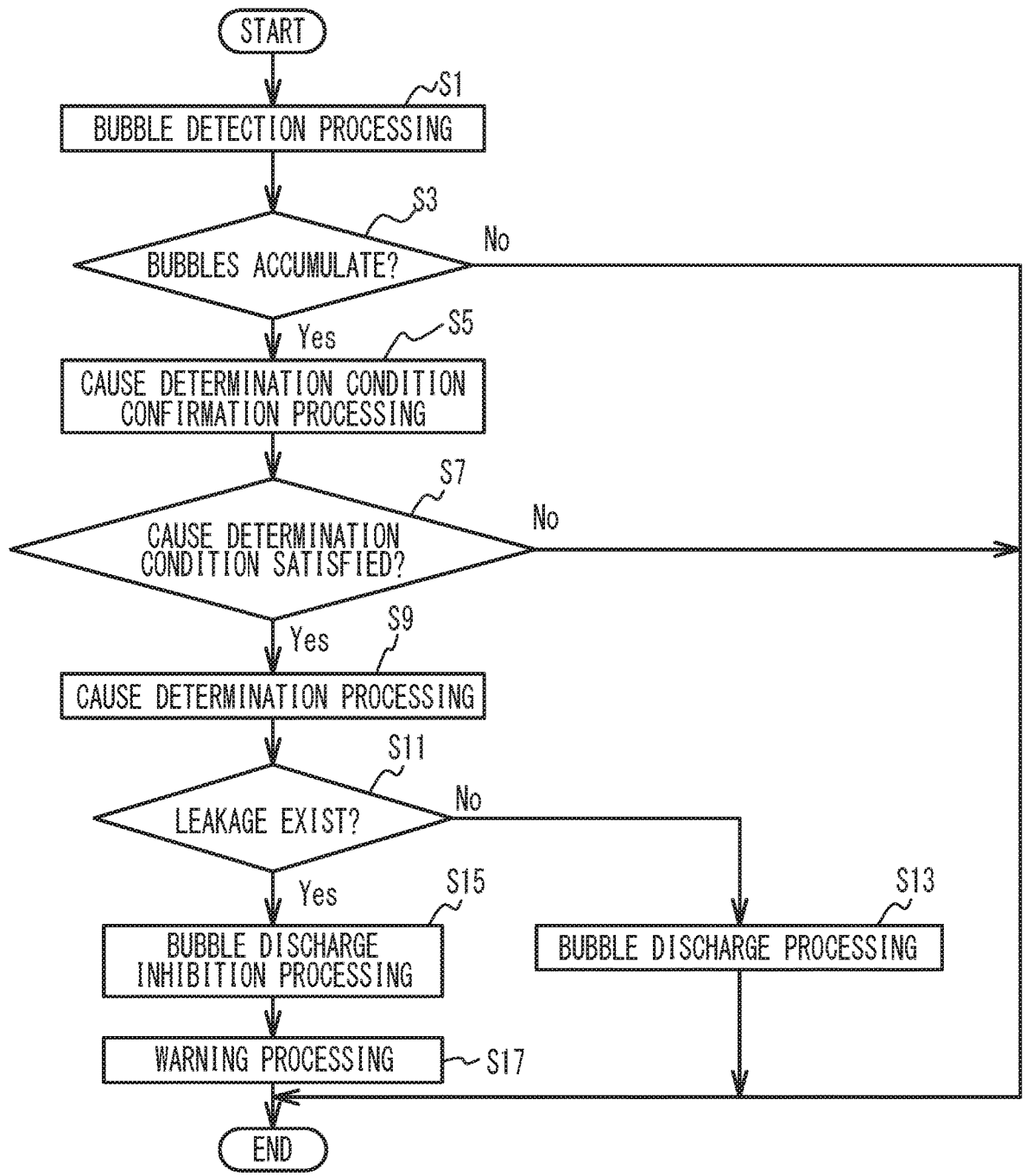
FIG. 3 is a flowchart illustrating an example of a control executed by a control device.

FIG. 3 is a flowchart illustrating an example of control executed by the control device 30. This control is repeatedly executed at predetermined intervals. Firstly, the control executes the bubble detection processing that determines whether the bubbles accumulate in the cooling water flow path 16 or not (step S1). When the bubbles exist in the cooling water flow path 16, the stack 20 is not cooled sufficiently and the power generating efficiency may be degraded. Thus, the bubble detection processing is executed The bubble detection processing will be described later in detail. A possible cause of the accumulation of bubbles in the cooling water flow path 16 is mixed air or leaked reactant gas. The mixed air is mixed in the cooling water supply system 160 at the time of manufacturing the system 1 or at the time of exchanging the cooling water of the system 1. The leaked reactant gas leaks from one of the fuel gas flow path 12 and the oxidant gas flow path 14 to the cooling water flow path 16. For example, a case where the fuel gas leaks from the fuel gas flow path 12 to the cooling water flow path 16 may be caused due to deterioration of sealing performance of the sealing member that seals the fuel gas flow path 12 and the cooling water flow path 16 in the stack 20 for some reason. The above holds true for a case where the oxidant gas leaks from the oxidant gas flow path 14 to the cooling water flow path 16.

Next, it is determined whether or not bubbles accumulate on the basis of the result of the bubble detection processing (step S3). When a negative determination is made in step S3, this control ends. An affirmative determination made in step S3 is followed by the cause determination condition confirmation processing that confirms whether the cause determination condition is satisfied or not (step S5). Then, on the basis of the result of the cause determination condition confirmation processing, it is determined whether or not the cause determination condition is satisfied (step S7). The cause determination condition is a precondition that is required for executing the cause determination processing, which will be described later. The cause determination condition will be also described later. When a negative determination is made in step S7, this control ends. When an affirmative determination is made in step S7, the cause determination processing is executed (step S9). The cause determination processing is executed for determining whether the accumulation of bubbles in the cooling water flow path 16 is caused by the leakage of reactant gas or not.

After that, it is determined whether or not the leakage of the reactant gas exists (step S11). When a negative determination is made in step S11, a bubble discharge processing is executed (step S13). In this processing, the bubbles are discharged from the cooling water flow path 16 by increasing and decreasing the rotating speed of the pump 164. More specifically, the pump 164 is repeatedly and alternately switched between high and low rotating speeds at predetermined intervals. With the above, the flow amount of the cooling water in the cooling water flow path 16 is repeatedly increased and decreased, and discharging of the bubbles from the cooling water flow path 16 is thus facilitated. The bubbles discharged from the cooling water flow path 16 are guided into the reserve tank 154 via the circulation path 161, and are then discharged to the atmosphere. In the above-described manner, the bubbles are discharged from the cooling water supply system 160. The pump 164 is an example of a removal device that is configured to remove accumulated bubbles from the cooling water flow path 16. Consequently, it is possible to suppress the bubbles discharged from the cooling water flow path 16 from returning to the cooling water flow path 16 of the stack 20 again, and the deterioration in cooling performance and power generating efficiency of the stack 20 is suppressed.

The pump 164 is described as an example of the removal device, which is not limited to the pump 164. For example, the removal device may be a vibrator that vibrates the stack 20. The vibrator vibrates the stack 20 and removes the bubbles from the cooling water flow path 16. The vibrator is, for example, a ultrasonic vibrator using piezoelectric ceramic such as PZT. Such a vibrator is disposed on the outer wall surface of the case of the stack 20, and vibrates the stack 20 to the extent to which no misalignment of the unit cell is caused. Flow path grooves are formed on the facing surface sides of the separators facing each other and have a concave-convex shape. With the above, it is possible to facilitate flowing of the bubbles accumulated in the flow path grooves to the cooling water manifold 16b and to facilitate discharging of the bubbles from the cooling water flow path 16.

An affirmative determination made in step S11 is followed by the above-described bubble discharge inhibition processing is executed that inhibits the bubble discharge processing (step S15). As described above, the case where an affirmative determination is made in step S11 represents the state that the reactant gas leaks from at least one of the fuel gas flow path 12 and the oxidant gas flow path 14 to the cooling water flow path 16. Because of this, even if the bubbles are discharged from the cooling water flow path 16 by executing the bubble discharge processing, the reactant gas may leak to the cooling water flow path 16 again and the bubbles may accumulate in the cooling water flow path 16. In this case, it is required to repeatedly execute the bubble discharge processing in order to discharge the bubbles from the cooling water flow path 16, which increases power consumption. Taking the above into consideration, according to the present embodiment, when it is determined that the leakage of the reactant gas exists, the bubble discharge processing is inhibited, which makes it possible to suppress the power consumption of the pump 164 for executing the bubble discharge processing.

After the bubble discharge inhibition processing is executed, the warning processing is executed (step S17). In the warning processing, the HMI device 103 issues a warning to the occupant of the vehicle. An exemplary warning displays an image that urges the driver to inspect or repair the stack 20 on the display screen of the HMI device 103. When it is determined that the leakage exists, it may also inhibit the stack 20 from generating power and inhibit the pump 164 from operating. It may also switch the traveling mode of the vehicle to the saving traveling mode in which only the saving traveling mode is enabled, when it is determined that the leakage exists. In the saving traveling mode, the vehicle is enabled to travel by a secondary battery (not illustrated) while the operation of the stack 20 is stopped. Step S17 may be executed before step S15.

As described above, the unit cell 10-1 on one end side of the stacked body 10 is located above the unit cell 10-n on the other end side in the gravity direction. This arrangement of the present embodiment hardly discharges the bubbles from the cooling water flow path 16, compared to a case where unit cells are stacked horizontally, as will be described later in detail. Therefore, in the bubble discharge processing in the present embodiment, the upper limit of the rotating speed of the pump 164 is set relatively high, which increases power consumption. Therefore, the inhibition of the bubble discharge processing performed when it is determined that the leakage exists is suitable for a case where the bubble discharge processing consumes a relatively large amount of power, as with the present embodiment.

Figure 4A:
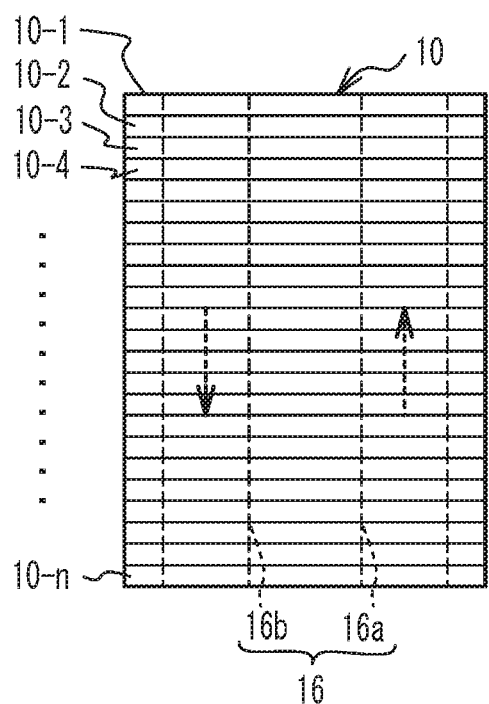
FIG. 4A is an explanatory view illustrating a stacked body of a case in which no bubble exists in a cooling water flow path.
Figure 4B:
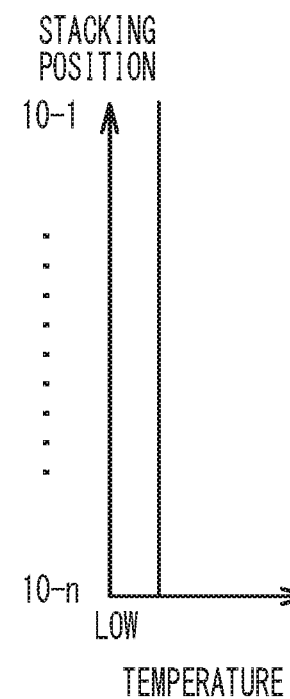
FIG. 4C is a graph illustrating a cell voltage of each unit cell in the stacked body in FIG. 4A.
FIG. 4D is an explanatory view illustrating a stacked body of a case in which bubbles accumulate in the cooling water flow path.
FIG. 4E is a graph illustrating a temperature of each unit cell in the stacked body in FIG. 4D.
FIG. 4F is a graph illustrating a cell voltage of each unit cell in the stacked body in FIG. 4D.
Figure 4C:
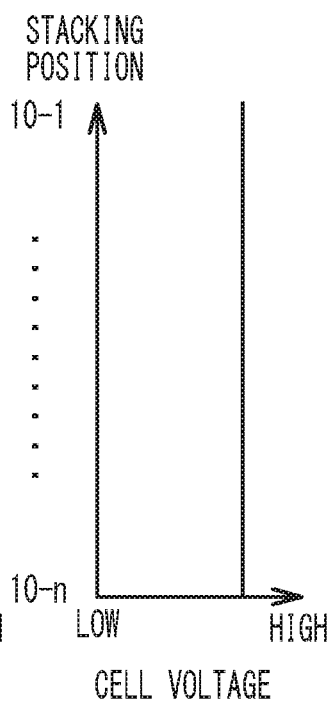

The bubble detection processing is now described. FIGS. 4A through 4C are explanatory views of a case where no bubble exists in the cooling water flow path 16. FIG. 4A illustrates the stacked body 10. FIG. 4B illustrates the temperature of each unit cell. FIG. 4C illustrates the cell voltage of each unit cell. Longitudinal axes in FIGS. 4B and 4C represent stacking positions of each unit cell. The unit cell at the uppermost position on the longitudinal axis is the unit cell 10-1, which is located uppermost in the gravity direction. The unit cell at the lowermost position on the longitudinal axis is the unit cell 10-$n$, which is located lowermost in the gravity direction. The horizontal axis in FIG. 4B indicates the temperature of each unit cell, and the horizontal axis of FIG. 4C indicates the cell voltage of each unit cell. The left side of the horizontal axis in FIG. 4B indicates low temperature, and the right side thereof shows high temperature. The left side of the horizontal axis in FIG. 4C indicates low voltage, and the right side thereof shows high voltage. When no bubble exists in the cooling water flow path 16, each unit cell is approximately equally cooled by the cooling water, and the temperature of each unit cell is approximately the same. With the above, the power generating efficiency of each unit cell is secured, and the cell voltage of each unit cell is approximately the same, whereby the power generating efficiency of the whole stack 20 is secured.

Figure 4D:
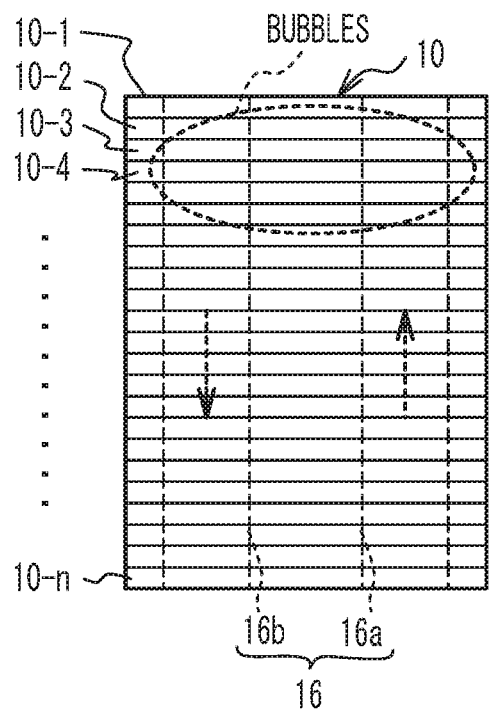
Figure 4E:
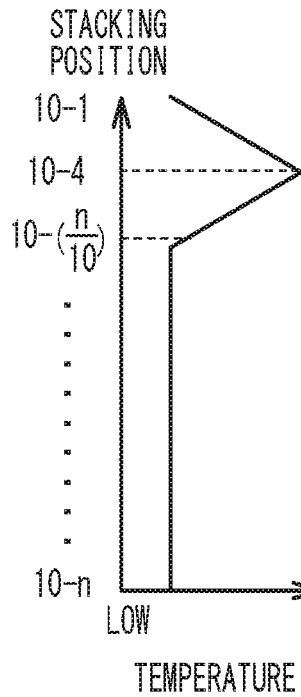
Figure 4F:
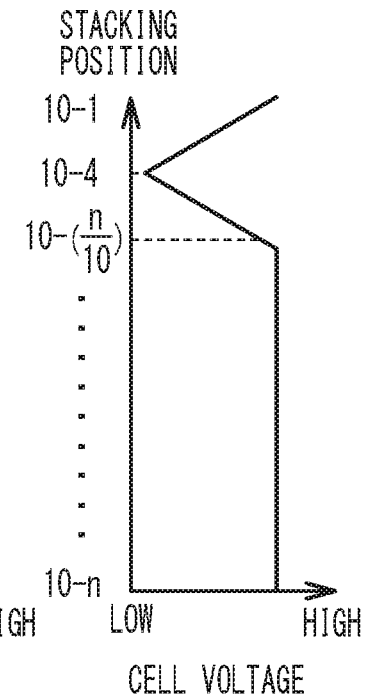

FIGS. 4D through 4F are explanatory views of a case in which the bubbles accumulate in the cooling water flow path 16. FIGS. 4D through 4F respectively correspond to FIGS. 4A through 4C. As illustrated in FIG. 4D, when the bubbles are mixed into the cooling water flow path 16, the bubbles are moved to the vicinity of the unit cell 10-1 located at the uppermost position in the gravity direction due to buoyancy acting on the bubbles. Then, the bubbles accumulate in the cooling water manifolds 16$a$ and 16$b$ close to the unit cell 10-1 or the flow path between the unit cells. Discharging of the bubbles accumulating in the above area from the cooling water flow path 16 requires the bubbles to flow downwardly against buoyancy in the gravity direction with the pressure of the cooling water in the cooling water manifold 16$b$, which extends in the gravity direction. The structure of the stacked body 10 makes it difficult to discharge the bubbles. When the stacked body is arranged so that the stacking direction corresponds to the horizontal direction, the cooling water manifold also extends horizontally, and the bubbles are easily discharged with the pressure so as not to move against buoyancy.

In the present embodiment, when the amount of bubbles accumulating around the unit cell 10-1 increases, the bubbles come to accumulate not only around the unit cell 10-1, but around some unit cells located at the lower side of the unit cell 10-1 in the gravity direction. The unit cells around the bubbles are not sufficiently cooled because of the bubbles, and the temperature of the unit cells around the bubbles increases. Therefore, drying of the electrolyte membrane of the unit cells around the bubbles progresses. Consequently, the cell voltages of the unit cells around the bubbles are lower than those of the other unit cells.

As illustrated in FIG. 4F, the cell voltage of the unit cell 10-1 located at the uppermost position in the gravity direction is not the lowest. The cell voltage of the unit cell 10-4 located slightly below the unit cell 10-1 is the lowest. This is because the unit cell 10-1 is located at the outermost of the stacked body 10, and heat radiation of the unit cell 10-1 is accelerated. Accordingly, the unit cell 10-1 and the unit cell 10-2 adjacent thereto are easily cooled. In contrast, the cell voltages of the unit cells located below the unit cell 10-4 are recovered. This is because no bubble exists around the unit cells located below the unit cell 10-4, and the cooling effect by the cooling water gradually increases.

Figure 5:
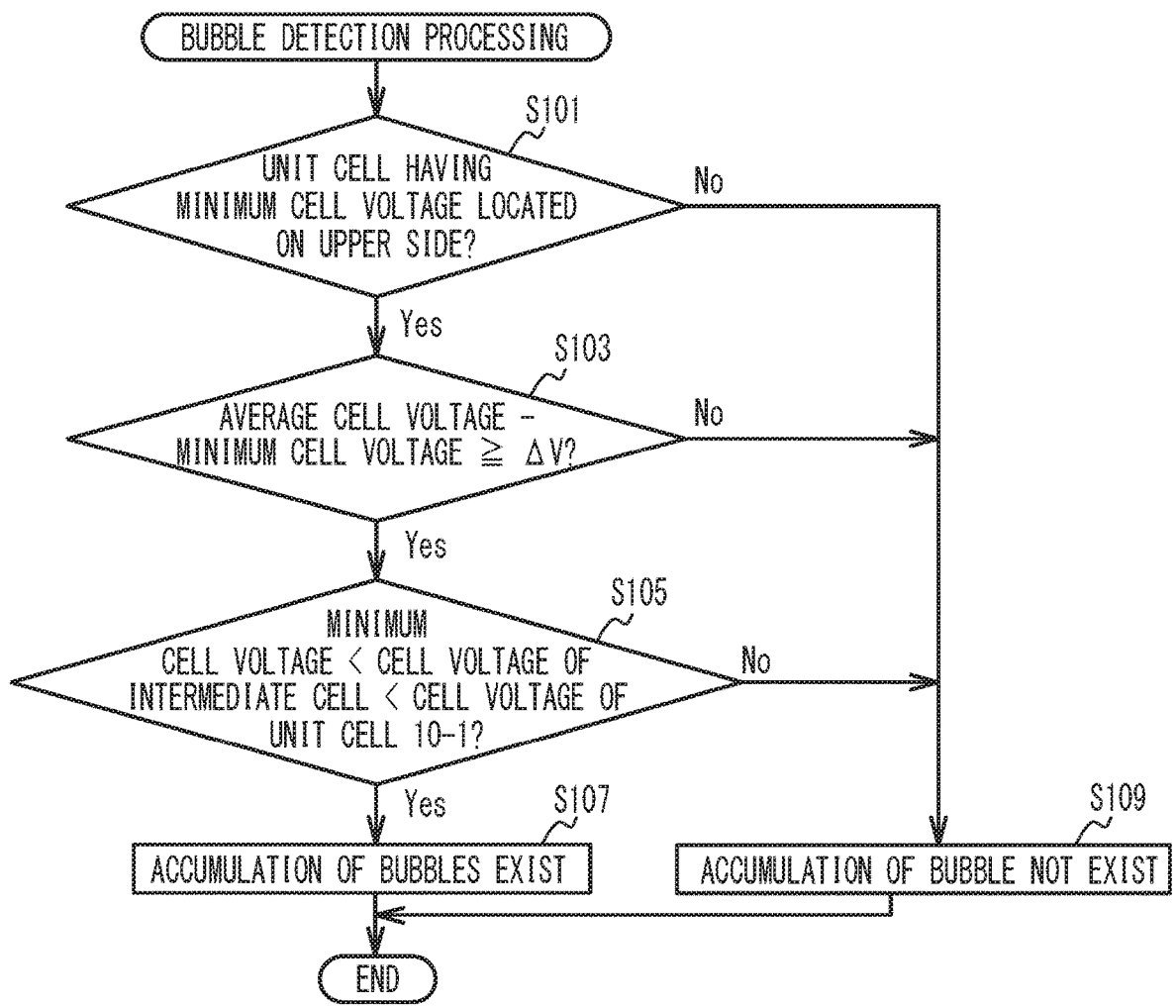
FIG. 5 is a flowchart illustrating an example of bubble detection processing.

In the bubble detection processing, it is determined whether or not the bubbles accumulate in the cooling water flow path 16 of the stacked body 10, by considering the characteristic of the cell voltage of each unit cell as described above. FIG. 5 is a flowchart illustrating an example of the bubble detection processing. Firstly, it is determined whether or not a unit cell having a minimum cell voltage, among the cell voltages of the unit cells obtained by the cell monitor 108, is located on the upper side of the stacked body 10 (step S101). More specifically, it is determined whether or not the unit cell having the minimum cell voltage is located between the unit cell 10-1 and the unit cell 10-($n$/10). As described above, n indicates the total number of the unit cells. The unit cell 10-($n$/10) is the n/10-th unit cell from the uppermost side.

When an affirmative determination is made in step S101, it is determined whether or not a value is not less than a threshold value $\Delta V$, the value being obtained by subtracting the minimum cell voltage from the average cell voltage of the cell voltages of all the unit cells (step S103). The average cell voltage may be calculated by dividing the total value of the cell voltages of the unit cells detected by the cell monitor 108 by the total number of the unit cells. The average cell voltage may also be calculated by dividing the voltage of the stack 20 detected by the voltage sensor 107 by the total number of the unit cells. The threshold value $\Delta V$ is stored in the ROM of the control device 30 in advance.

When an affirmative determination is made in step S103, it is determined whether or not the cell voltage of a unit cell, located between the unit cell having the minimum cell voltage and the unit cell 10-1, is higher than the minimum cell voltage and is lower than the cell voltage of the unit cell 10-1 (step S105). When an affirmative determination is made in step S105, it is determined that the accumulation of bubbles exists in the cooling water flow path 16 of the stacked body 10 (step S107). When a negative determination is made in any of steps S101, S103, and S105, it is determined that the accumulation of bubbles does not exist in the cooling water flow path 16 (step S109). Another determination may be made is step S105. For example, it may be determined that the accumulation of bubbles exists on the basis only of a fact that the unit cell having the minimum cell voltage is located above a predetermined position. Another example uses a sensor detecting the temperature of each unit cell and determines whether or not the accumulation of bubbles exists, on the basis of the temperature of each unit cell. This example does not use the cell voltage described above. Yet another example determines that the accumulation of bubbles exists only on the basis of a fact that the unit cell having the highest temperature is located above the predetermined position.

As described above, when it is determined that the accumulation of bubbles exists (Yes in step S3), the cause determination condition confirmation processing is executed (step S5). When the cause determination condition is satisfied (Yes in step S7), the cause determination processing is executed (step S9). The cause determination condition confirmation processing is now described as follows.

Figure 6A:
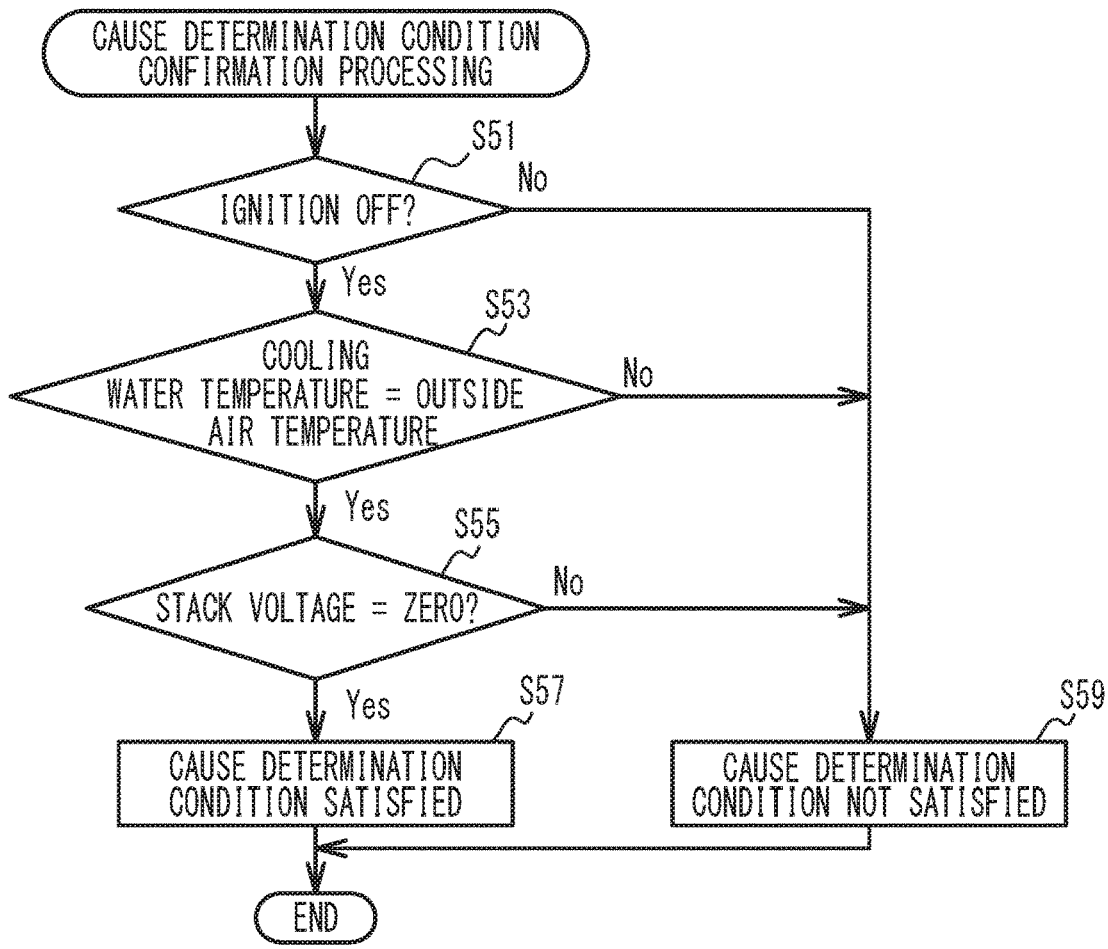
FIG. 6A is a flowchart illustrating an example of cause determination condition confirmation processing of an embodiment.

FIG. 6A is a flowchart illustrating an example of the cause determination condition confirmation processing in the present embodiment. Firstly, it is determined whether or not the ignition is off by referring to the output from the ignition switch 101 (step S51). This determination will be described later in detail. When an affirmative determination is made in step S51, it is detected whether or not the cooling water temperature reaches the outside air temperature by referring to the detection results of the water temperature sensor 16T and the outside air temperature sensor 102 (step S53). For example, it may be determined that the cooling water temperature reaches the outside air temperature, when the cooling water temperature is in a predetermined range where a difference between the cooling water temperature and the outside air temperature is nearly zero. This determination will be described later in detail.

When an affirmative determination is made in step S53, it is determined whether or not the voltage of the stack 20 is zero (step S55). It is to be noted that immediately after the ignition is turned off, the fuel gas and the oxidant gas remain in the stack 20, so the voltage of the stack 20 does not become zero. Thus, the processing of step S55 is executed, which will be described later in detail. When an affirmative determination is made in step S55, it is determined that the cause determination condition is satisfied (step S57). When a negative determination is made in any steps of S51, S53, and S55, it is determined that the cause determination condition is not satisfied (step S59).

Figure 6B:
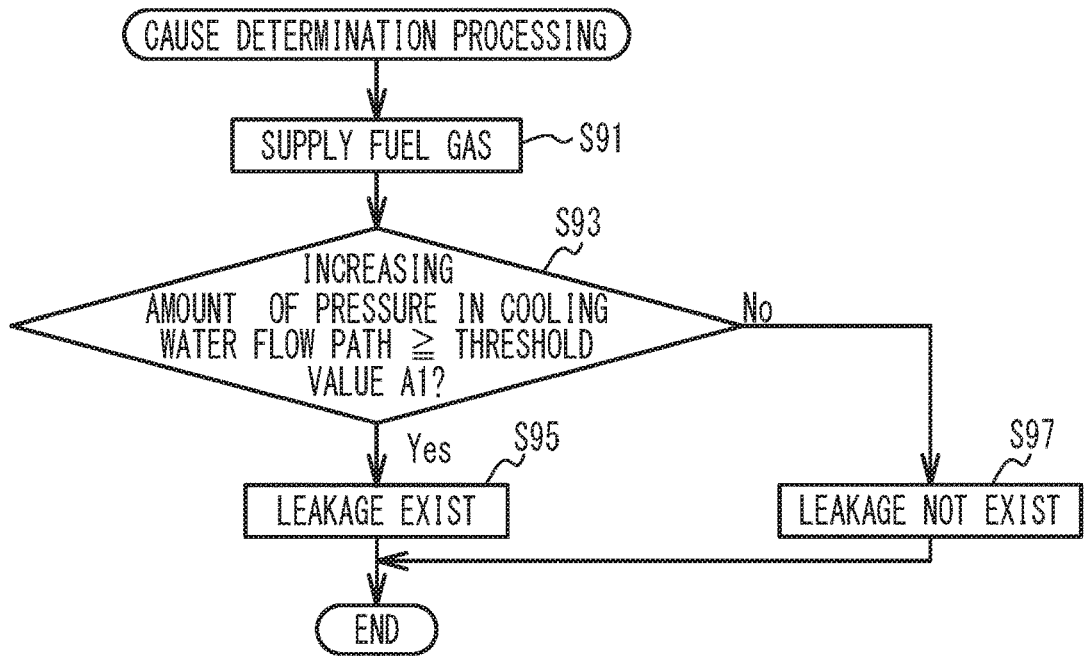
FIG. 6B is a flowchart illustrating an example of cause determination processing in the present embodiment.

As described above, when it is determined that the cause determination condition is satisfied after the cause determination condition confirmation processing is executed (Yes in step S7), the cause determination processing is executed (step S9). FIG. 6B is a flowchart illustrating an example of the cause determination processing in the present embodiment. When the affirmative determinations are made in steps S51, S53, and S55, the tank valve 124, the pressure adjusting valve 125, and the injection valve 126 are controlled to supply a predetermined amount of the fuel gas to the fuel gas flow path 12 (step S91). The tank valve 124, the pressure adjusting valve 125, and the injection valve 126 are examples of a supply device that supplies the fuel gas to the fuel gas flow path 12.

Then, it is determined whether or not an increasing amount of the pressure in the cooling water flow path 16 is not less than a threshold value A1, when or before a predetermined time passes from the time when the fuel gas of a predetermined amount is supplied to the fuel gas flow path 12, based on the detection result of the water pressure sensor 16P (step S93). The threshold value A1 is a value for determining whether the leakage exists or not. The threshold value A1 is defined based on results of an experiment in which the pressure in the cooling water flow path 16 is measured after the fuel gas is supplied, in both cases where the leakage exists and does not exist. The threshold value A1 is stored in the ROM of the control device 30 in advance. When an affirmative determination is made in step S93, it is determined that the leakage exists, as a part of the fuel gas supplied to the fuel gas flow path 12 leaks to the cooling water flow path 16, which causes the pressure in the cooling water flow path 16 to increase (step S95). When a negative determination is made in step S93, it is determined that the leakage does not exist, as the fuel gas supplied to the fuel gas flow path 12 does not affect the pressure in the cooling water flow path 16 (step S97).

The reason for determining whether the ignition is turned off or not as in step S51 is as follows. In the ignition-on state, the quantity of power generation required to the stack 20 is switched based on, for example, the amount of operation of the accelerator pedal AP, and the rotating speed of the pump 164 is adjusted according to the required quantity of power generation. That is, in the ignition-on state, the pressure in the cooling water flow path 16 tends to be variable. Thus, even if the cause determination processing is executed based on the increase of pressure in the cooling water flow path 16 in the ignition-on state as described above, it is impossible to determine whether the increase of pressure in the cooling water flow path 16 is caused by the increase of rotating speed of the pump 164 or by the leakage of the fuel gas. Because of this, it may be mistakenly determined that the leakage exists, as the increasing amount of pressure in the cooling water flow path 16 is not less than the threshold value A1 due to the increase of the rotating speed of the pump 164, even although the leakage does not exist. In contrast, when the ignition is off, the pump 164 stops, and the pressure in the cooling water flow path 16 is not affected by the rotating speed of the pump 164. The cause determination condition includes the condition that the ignition is off in this embodiment, and the accuracy of leak determination is thus improved.

Now, a description is given of the reason for determining whether or not the cooling water temperature almost reaches the outside air temperature after the ignition is turned off as in step S53. When the ignition is turned off, the request for generating power for the stack 20 is stopped, the temperature of the stack 20 gradually decreases and finally becomes substantially equal to the outside air temperature. The temperature of cooling water also becomes substantially equal to the outside air temperature. When the temperature of the stack 20 decreases, the stacked body 10 is heat-contracted. Accordingly, the inner volume of the cooling water flow path 16 increases, and the pressure in the cooling water flow path 16 decreases. That is, while the temperature of the stack 20 decreases, the pressure in the cooling water flow path 16 tends to decrease. When the cause determination processing is executed in such a state, even if the leakage exists actually, there is a possibility of cancellation of pressure between the increasing amount of pressure in the cooling water flow path 16 due to the leakage and the decreasing amount of pressure in the cooling water flow path 16 due to the decrease of the temperature of the stack 20. Consequently, even although the leakage exists, the increase of pressure in the cooling water flow path 16 becomes less than the threshold value A1, and it may be mistakenly determined that there is no leakage. The cause determination condition includes the condition in which the temperature of cooling water almost reaches the outside air temperature in this embodiment, so that the accuracy of leak determination is improved. Instead of this processing, it may also be determined whether or not the change rate of the temperature of the cooling water becomes within a predetermined range. In other words, it may be determined whether or not the temperature of cooling water is almost constant.

A description is now given of the reason for determining whether the voltage of the stack 20 is zero or not after the ignition is turned off as in step 855. As described above, although the request for generating power for the stack 20 is stopped after the ignition is turned off, the fuel gas and the oxidant gas may remain behind in the stack 20. The residual fuel gas and the residual oxidant gas react each other, and the stack 20 may continue to generate power during a predetermined period even after the ignition is turned off. When the cause determination processing is executed while the stack 20 continues to generate power with the residual reactant gases, the fuel gas supplied for determining whether or not the leakage exists may be used for the power generation reaction with the residual oxidant gas. Further, there is a possibility that so-called cross leakage takes place. In the cross leakage, the fuel gas permeates the electrolyte membrane and flows into the oxidant gas flow path 14. Thus, the fuel gas is used for the reaction of the fuel gas and the residual oxidant gas in the oxidant gas flow path 14. Any of the causes described above and the presence of the leakage of the fuel gas from the fuel gas flow path 12 may decrease the leakage amount of the fuel gas to the cooling water flow path 16 may decrease and the increase of pressure in the cooling water flow path 16, so that the increase of pressure in the cooling water flow path 16 becomes less than the threshold value A1. Thus, it is mistakenly determined that there is no leakage. According to the present embodiment, the cause determination condition is designed to include the condition in which the voltage of the stack 20 is zero so that the accuracy of leak determination is improved. Instead of this processing, it may also be determined whether or not the change rate of the voltage of the stack 20 is equal to or less than a given threshold value.

In the above embodiment, the order of step S53 and step S55 does not matter. The processing in step S53 is optional. This is because the temperature of the stack 20 may decrease for a relatively long time after the ignition is turned off. In this case, even while the temperature of the stack 20 is decreasing, the increasing of pressure in the cooling water flow path 16 due to the leakage of the fuel gas is only slightly affected, and the accuracy of leak determination is hardly affected.

Figure 7:
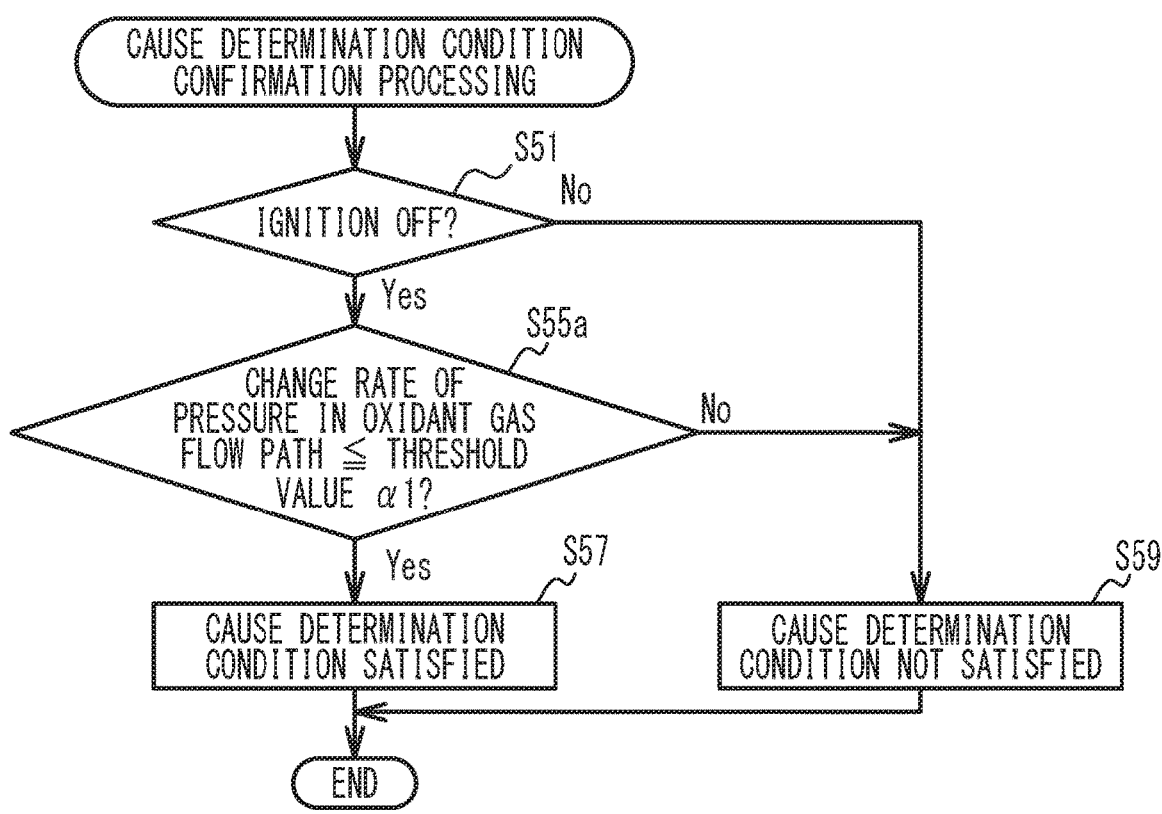
FIG. 7 is a flowchart illustrating an example of a variation of the cause determination condition confirmation processing.

Now, a description is given of variations of the above control. In the variations, the description of processing identical to the processing of the above embodiment is omitted. FIG. 7 is a flowchart illustrating an example of a variation of the cause determination condition confirmation processing. After the above-described step S51, it is determined whether or not the change rate of the pressure in the oxidant gas flow path 14 is equal to or less than a threshold value α1 on the basis of the detection result of the pressure sensor 14P (step S55a). The threshold value α1 is a value that shows the oxidant gas remains in the oxidant gas flow path 14 almost disappears. The threshold value α1 is obtained by the experiment in advance, and is stored in the ROM of the control device 30. Namely, it is determined whether or not the pressure in the oxidant gas flow path 14 gradually decreases and becomes substantially constant, after the ignition is turned off. When an affirmative determination is made in step S55a, it is determined that the cause determination condition is satisfied (step S57). When a negative determination is made in step S55a, it is determined that the cause determination condition is not satisfied (step S59).

A description is given of the reason for determining whether or not the change rate of the pressure in the oxidant gas flow path 14 is equal to or less than the threshold vale α1 in step S55a after the ignition is turned off. As described above, immediately after the ignition is turned off, the oxidant gas may remain in the oxidant gas flow path 14. In this case, if the fuel gas is supplied to the fuel gas flow path 12, the cross leakage may occur as described above. Then, it may be mistakenly determined that the leakage does not exist, even although the fuel gas leaks from the fuel gas flow path 12. The cause determination condition includes the condition in which the change rate of the pressure in the oxidant gas flow path 14 is equal to or less than the threshold vale α1 in this variation, so that the accuracy of leak determination is improved. In addition, in a state where the change rate of the pressure in the oxidant gas flow path 14 is equal to or less than the threshold value α1 after the ignition is turned off, it is possible to consider that the pressure in the fuel gas flow path 12 is approximately constant, since the fuel gas remains in the fuel gas flow path 12 has already been used. Therefore, even if the fuel gas is supplied to the fuel gas flow path 12, the accuracy of leak determination is not affected. This variation may also include the previously-described step S53 in the cause determination condition.

Figure 8A:
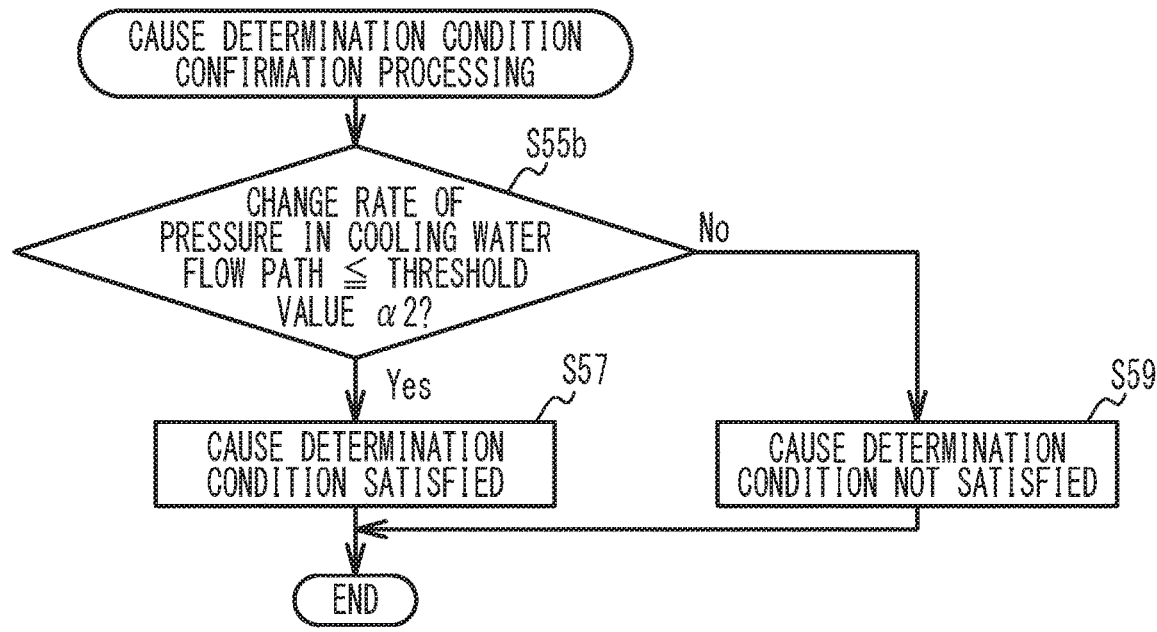
FIG. 8A is a flowchart illustrating an example of a variation of the cause determination condition confirmation processing.
Figure 8B:
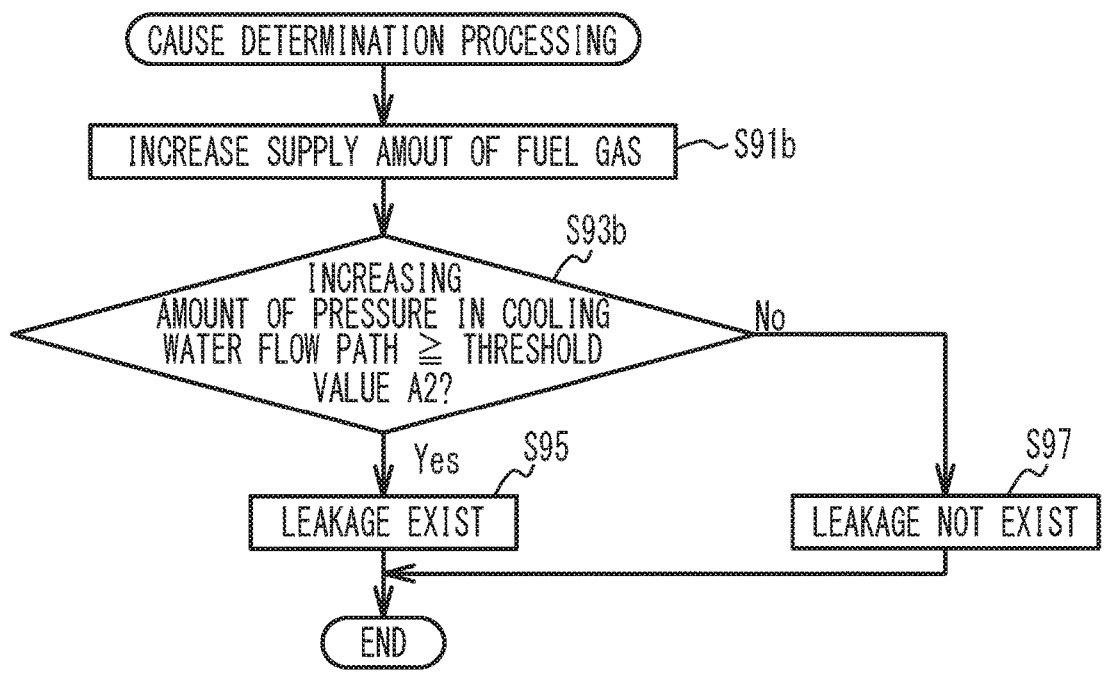
FIG. 8B is a flowchart illustrating an example of a variation of the cause determination processing.

FIG. 8A is a flowchart illustrating an example of a variation of the cause determination condition confirmation processing. FIG. 8B is a flowchart illustrating an example of a variation of the cause determination processing. Unlike the above-described cases, in this variation, the cause determination condition confirmation processing and the cause determination processing are executed while the stack 20 is generating power after the ignition is turned on. As illustrated in FIG. 8A, it is determined whether or not the change rate of the pressure in the cooling water flow path 16 is equal to or less than a threshold value α2 (step S55b). The threshold value α2 is a value that makes it possible to detect an increase of the pressure in the cooling water flow path 16, when the supply amount of the fuel gas is increased in the presence of the leakage as will be described later. The threshold value α2 is experimentally obtained in advance, and is stored in the ROM of the control device 30. When the change rate of the pressure in the cooling water flow path 16 is equal to or less than the threshold α2, the quantity of power generation required to the stack 20 has a small variation rate, such as in the idling state. In such a case, the rotating speed of the pump 164 is also approximately constant. Thus, the change rate of the pressure in the cooling water flow path 16 is likely to be equal to or less than the threshold value α2. When an affirmative determination is made in step S55b, it is determined that the cause determination condition is satisfied (step S57). When a negative determination is made in step S55b, it is determined that the cause determination condition is not satisfied (step S59).

In the cause determination processing in this variation, as illustrated in FIG. 8B, the supply amount of the fuel gas is increased by a predetermined amount from the supply amount of the fuel gas, which is defined in advance depending on the power generation amount required to the stack 20, so that the pressure in the fuel gas flow path 12 is higher than the pressure in the cooling water flow path 16 (step S91b). Then, it is determined, on the basis of the detection result by the water pressure sensor 16P, whether or not the increase of the pressure in the cooling water flow path 16 is equal to or larger than the threshold value A2, before a predetermined time passes from the time when the supply amount of the fuel gas is increased (step S93b). The threshold value A2 is a value for determining whether the leakage exists or not. The threshold value A2 is defined based on results of an experiment in which the pressure in the cooling water flow path 16 is measured after the supply amount of the fuel gas is increased in both cases where the leakage exists and the leakage does not exist. The threshold value A2 is stored in the ROM of the control device 30. When it is determined that the leakage exists in this variation, the power generation by the stack 20 may forcibly be stopped.

The following processing may also be executed, instead of the processing in the above step S93b. Firstly, the processing refers to a map and calculates pressure in the cooling water flow path 16 in a normal state having no leakage (hereinafter, the above pressure is referred to as normal pressure). The map defines the relationship among the rotating speed of the pump 164, the temperature of the cooling water, and the pressure in the cooling water flow path 16 in the normal state having no leakage. The normal pressure increases as the rotating speed of the pump 164 increases. The normal pressure decreases as the temperature of the cooling water increases. Next, it is determined whether or not a value, calculated by subtracting the normal pressure from actual pressure in the cooling water flow path 16 detected by the water pressure sensor 16P, is not less than a predetermined value. When an affirmative determination is made, it is recognized that the actual pressure is greatly increased from the normal pressure due to the increase of the supply amount of the fuel gas and that the leakage exists. When a negative determination is made, it is recognized that the actual pressure is approximately equal to the normal pressure and that no leakage exists.

As the variations illustrated in FIGS. 8A and 8B are executed in the state where the ignition is turned on, the bubble discharge inhibition processing is executed by stopping the power supply to the pump 164 in these variations. Thus, the power consumption by the pump 164 is suppressed. Together with stopping the power supply to the pump 164, the power generation by the stack 20 is stopped. The bubble discharge inhibition processing may be executed in such a manner that an upper limit guard value of the rotating speed of the pump 164 is set smaller than that used when it is determined that no leakage exists. This setting suppresses the power consumption of the pump 164 during the bubble discharge processing. The upper limit guard value that is used when it is determined that the leakage exists is set smaller than the maximum rotating speed of the pump 164 used when the bubble discharge processing is executed.

Figure 9:
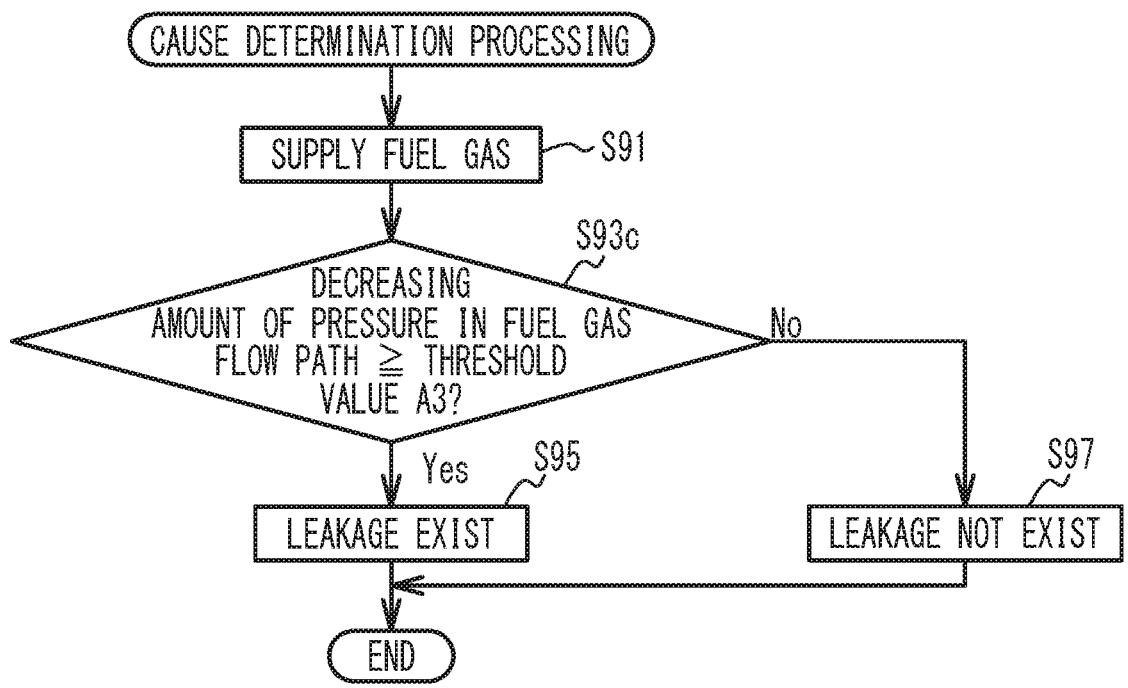
FIG. 9 is a flowchart illustrating an example of a variation of the cause determination processing.

FIG. 9 is a flowchart illustrating a variation of the cause determination processing. This variation presupposes that the cause determination condition includes the condition that the ignition is turned off, as illustrated in FIG. 6A and FIG. 7. It is determined whether or not the decrease of the pressure in the fuel gas flow path 12 during a predetermined period after the execution of step S91 is equal to or more than a threshold value A3 (step S93c). The threshold value A3 is a value for determining whether the leakage exists or not. The threshold value A3 is defined based on results of an experiment in which the pressure in the fuel gas flow path 12 is measured after the fuel gas is supplied in both cases where the leakage exists and does not exist. The threshold value A3 thus obtained is stored in the ROM of the control device 30 in advance. During the supply of the fuel gas, the pressure in the fuel gas flow path 12 increases. After the supply is stopped, a relatively small amount of the pressure in the fuel gas flow path 12 decreases in the absence of the leakage, while a relatively large amount of the pressure in the fuel gas flow path 12 decreases in the presence of the leakage. In this way, it is possible to determine whether or not the leakage exists, on the basis of the decrease of the pressure in the fuel gas flow path 12, not the increase of the pressure in the cooling water flow path 16. Only when affirmative determinations are made in both steps S93 and S93c, it may be determined that the leakage exists. This improves the accuracy of the leak determination.

Figure 10A:
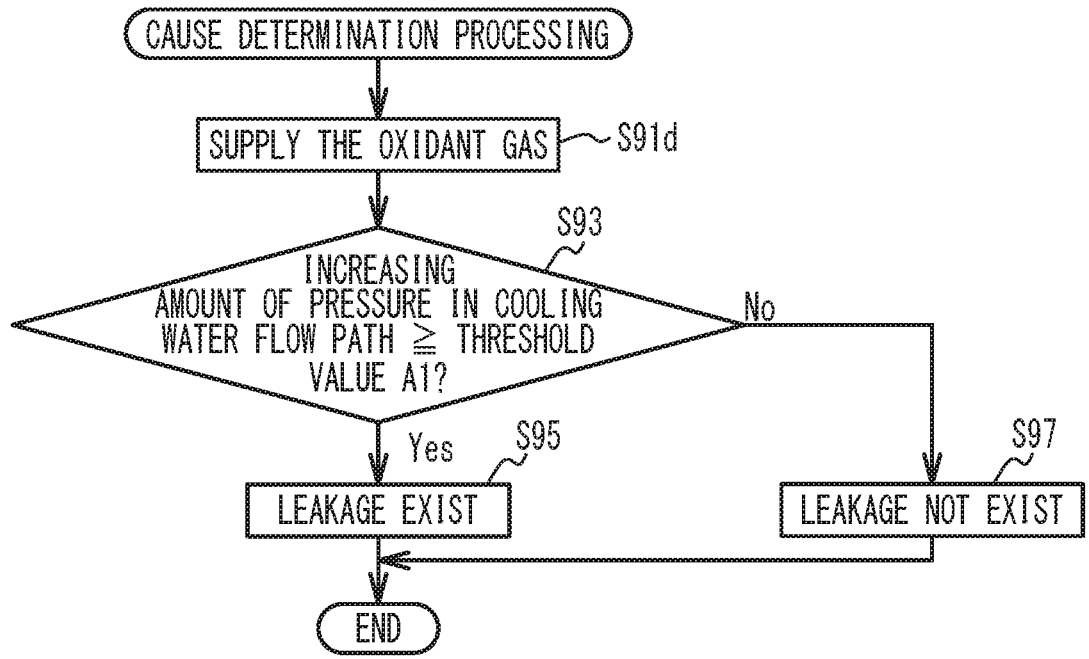
FIG. 10A is a flowchart illustrating a variation of the cause determination processing.

FIG. 10A is a flowchart illustrating a variation of the cause determination processing. This variation presupposes the cause determination condition illustrated in FIG. 6A and FIG. 7. Unlike the cause determination condition described above, instead of supplying the fuel gas to the fuel gas flow path 12, a predetermined amount of the oxidant gas is supplied to the oxidant gas flow path 14 by controlling the air compressor 149 (step S91d). The air compressor 149 is an example of a supply device that supplies the oxidant gas to the oxidant gas flow path 14. Then, the processing in step S93 is executed as described above. When the oxidant gas leaks to the cooling water flow path 16 from the oxidant gas flow path 14, the increasing amount of the pressure in the cooling water flow path 16 is not less than the threshold value A1, and it is thus determined that the leakage exists. In this way, it is possible to determine whether or not the leakage exists by the supply of the oxidant gas, the leakage being caused by the degradation of sealing between the oxidant gas flow path 14 and the cooling water flow path 16.

Figure 10B:
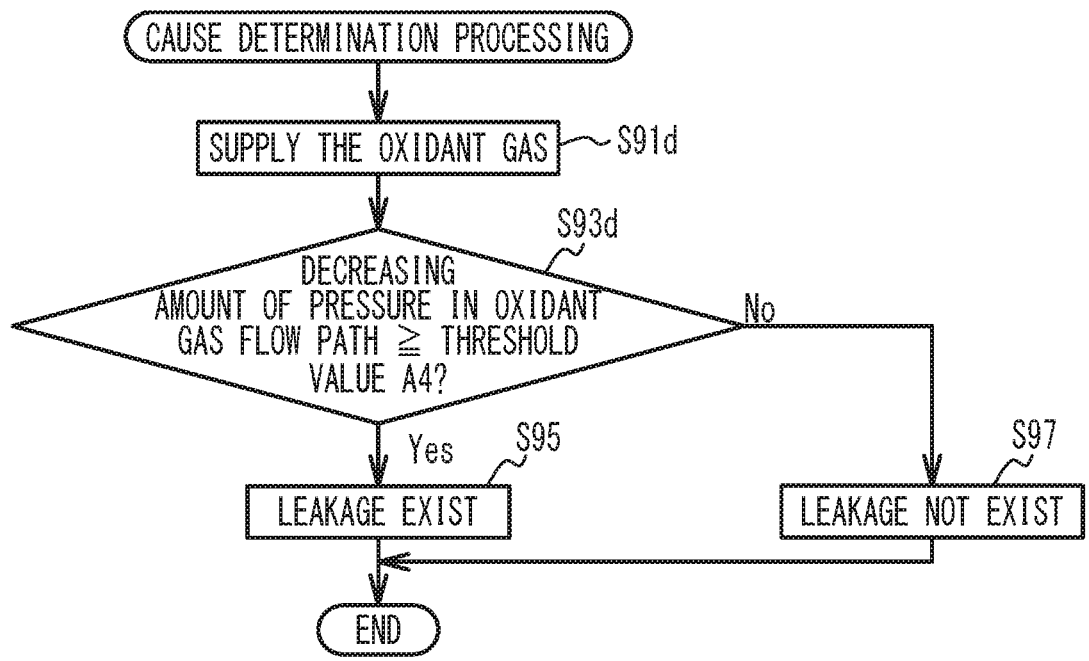
FIG. 10B is a flowchart illustrating another variation of the cause determination processing.

FIG. 10B is a flowchart illustrating a variation of the cause determination processing. This variation presupposes the cause determination condition illustrated in FIG. 6A and FIG. 7. After the predetermined amount of the oxidant gas is supplied to the oxidant gas flow path 14 (step S91d), it is determined whether or not the decreasing amount of the pressure in the oxidant gas flow path 14 is not less than a threshold value A4 (step S93d). The threshold value A4 is a value for determining whether the leakage exists or not. The threshold value A4 is defined based on results of an experiment in which the pressure in the oxidant gas flow path 14 is measured after the oxidant gas is supplied in both cases where the leakage exists and does not exist. The threshold value A4 thus obtained is stored in the ROM of the control device 30 in advance. During the supply of the oxidant gas, the pressure in the oxidant gas flow path 14 increases. After the supply is stopped, a relatively small amount of the pressure in the oxidant gas flow pathcomp 14 decreases in the absence of the leakage, while a relatively large amount of the pressure in the oxidant gas flow path 14 decreases in the presence of the leakage. Only when affirmative determinations are made in both steps S93 and S93d, it may be determined that the leakage exists. In the variations illustrated in FIGS. 10A and 10B, the oxidant gas is supplied to the stack 20 in a state where little fuel gas exists in the fuel gas flow path 12. Thus, the stack 20 becomes a hydrogen shortage condition, which may affect the power generation performance of the stack 20. Therefore, the variations in FIGS. 10A and 10B may be executed, when it is considered that the leakage is likely to exist, or when the fuel gas substantially does not remain in the tank 110.

Figure 11A:
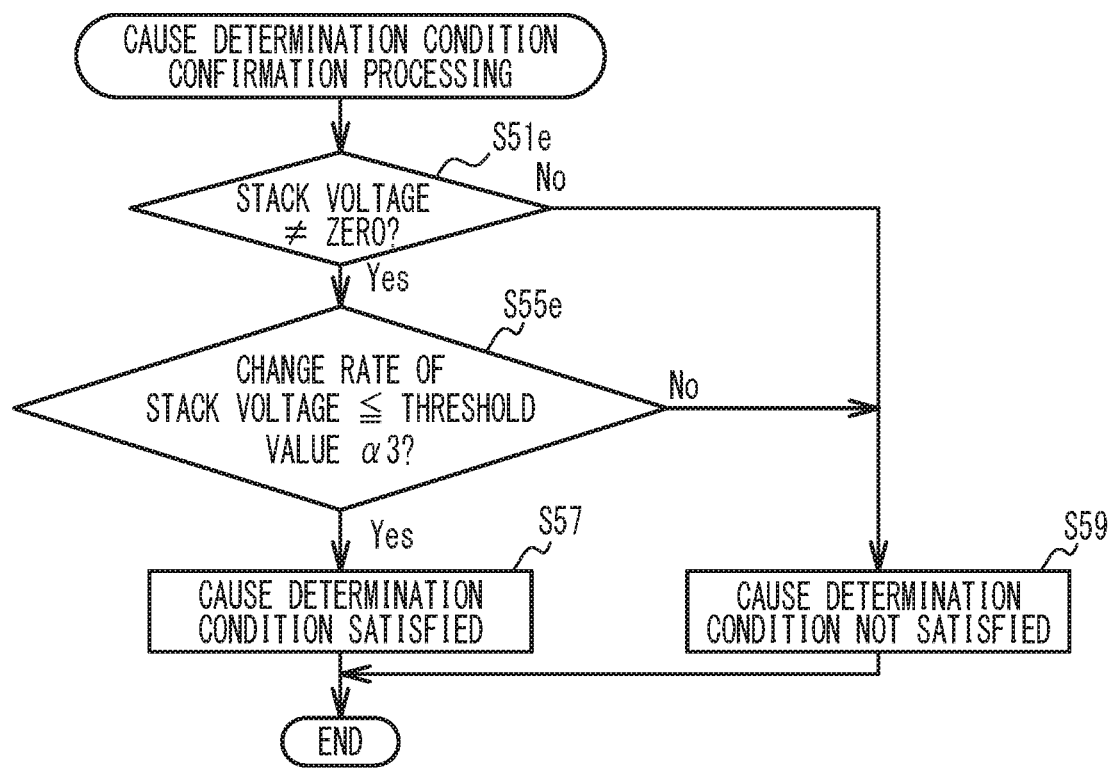
FIG. 11A is a flowchart illustrating a variation of the cause determination condition confirmation processing.
Figure 11B:
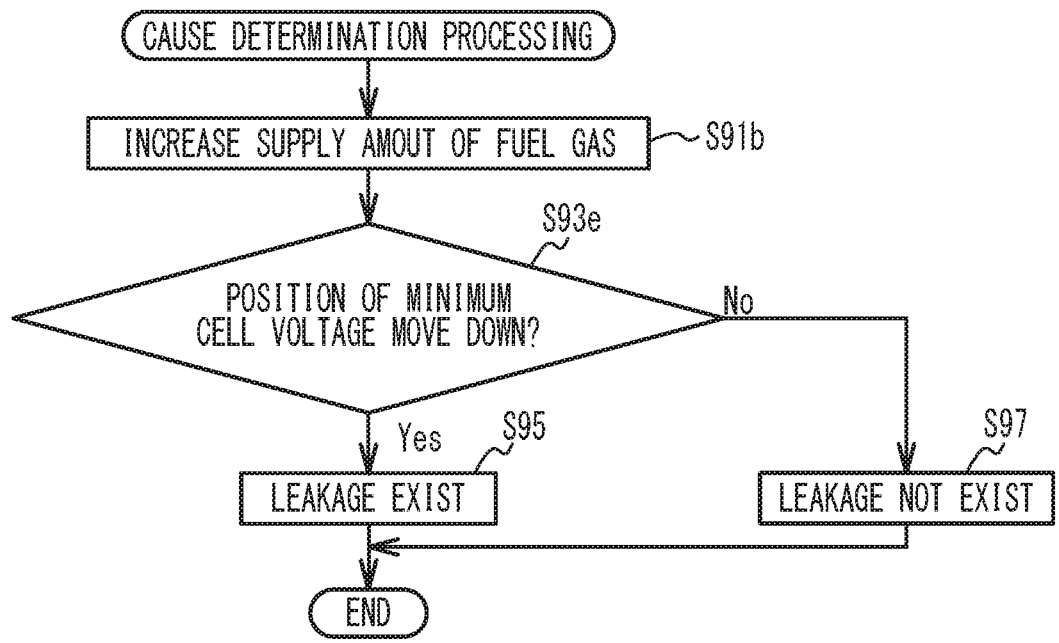
FIG. 11B is a flowchart illustrating a variation of the cause determination processing.

FIG. 11A is a flowchart illustrating a variation of the cause determination condition confirmation processing. FIG. 11B is a flowchart illustrating a variation of the cause determination processing. The cause determination processing in FIG. 11B presupposes the cause determination condition confirmation processing illustrated in FIG. 11A. It is determined whether or not the voltage of the stack 20 is other than zero (step S51e). In other words, it is determined whether or not the stack 20 is generating power. When an affirmative determination is made in step S51e, it is determined whether or not the change rate of the voltage of the stack 20 is not more than a threshold value a3 (step S55e). That is, it is determined whether or not the power generation amount of the stack 20 during power generation is approximately constant. When an affirmative determination is made in step S55e, it is determined that the cause determination condition is satisfied (step S57). When a negative determination is made in any of steps S51e and S55e, it is determined that the cause determination condition is not satisfied (step S59).

As illustrated in FIG. 11B, the supply amount of the fuel gas is increased by a predetermined amount (step S91b). Then, the detection result by the cell monitor 108 is referred to and it is determined whether or not the position of the unit cell outputting the minimum cell voltage among the cell voltages of the unit cells moves down in the gravity direction after the supply amount of the fuel gas is increased (step S93e). The processing of step S93e will be described later in detail. When an affirmative determination is made in step S93e, it is determined that the leakage exists (step S95). When a negative determination is made in step S93e, it is determined that the leakage does not exist (step S97).

Figure 12A:
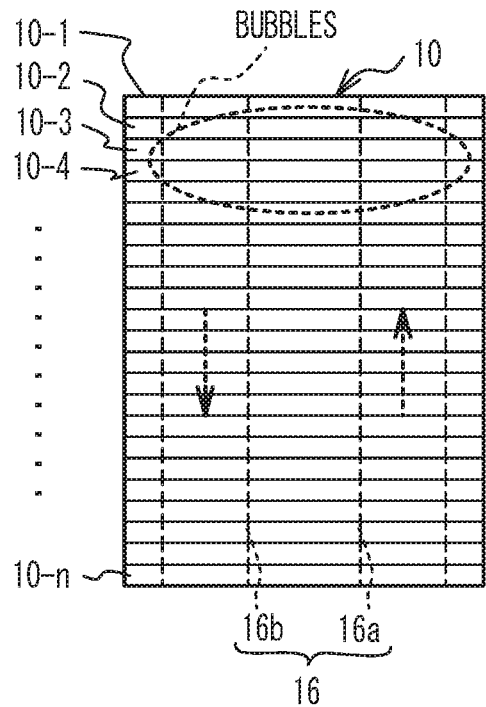
FIG. 12A is an explanatory view about a variation illustrating a stacked body of a case in which bubbles accumulate in the cooling water flow path.
Figure 12B:
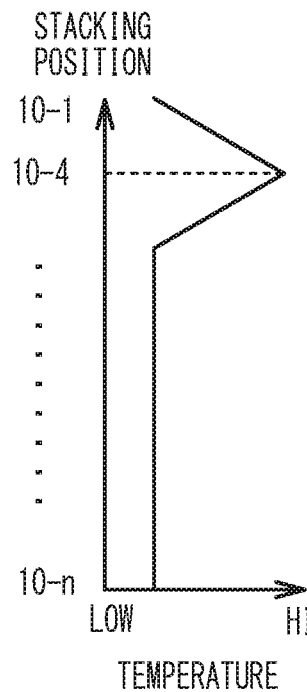
FIG. 12B is a graph illustrating a temperature of each unit cell in the stacked body in FIG. 12A.
Figure 12C:
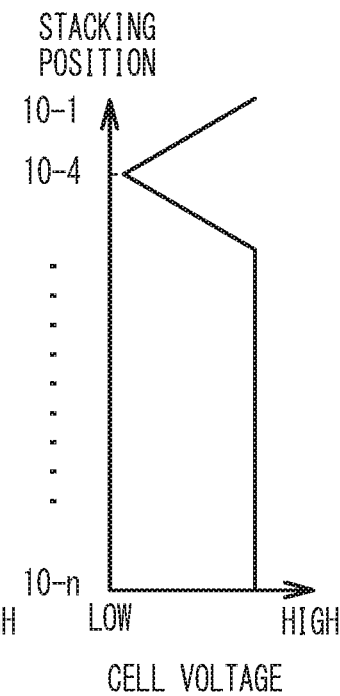
FIG. 12C is a graph illustrating a cell voltage of each unit cell in the stacked body in FIG. 12A.
Figure 12D:
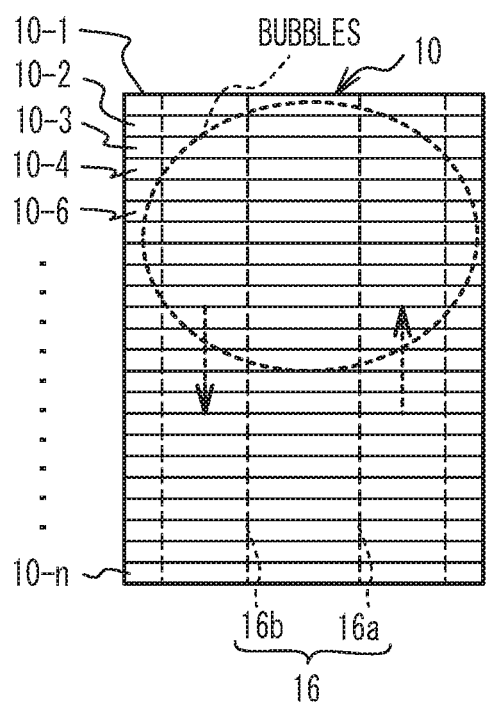
FIG. 12D is an explanatory view about a variation illustrating a stacked body of a case in which accumulated bubbles increase in the cooling water flow path.
Figure 12E:
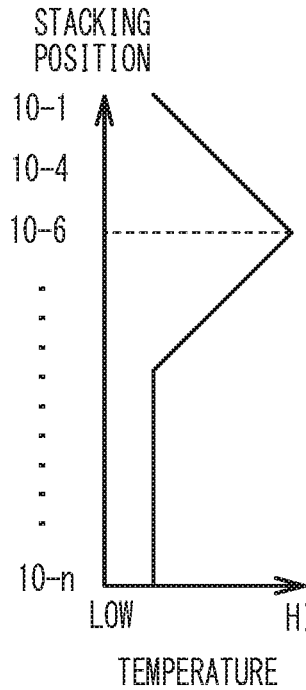
FIG. 12E is a graph illustrating a temperature of each unit cell in the stacked body in FIG. 12D.
Figure 12F:
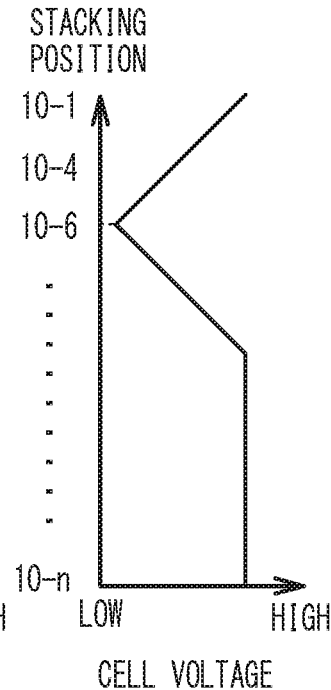
FIG. 12F is a graph illustrating a cell voltage of each unit cell in the stacked body in FIG. 12D.

The above step S93e is now described. FIGS. 12A through 12F are explanatory views about variations in cell voltages of the unit cells. FIGS. 12A through 12C respectively correspond to FIGS. 4D through 4F illustrating the case where the bubbles accumulate in the cooling water flow path 16. In the state where the leakage exists, if the supply amount of the fuel gas is increased in the state where the bubbles accumulate in the cooling water flow path 16, the bubbles are increased as illustrated in FIG. 12D, since bubbles caused by the increase of the supply amount of the fuel gas are further added to the bubbles accumulated in the cooling water flow path 16 at the upper side in the gravity direction. Because of this, as illustrated in FIG. 12E, the position of the unit cell having the highest temperature among the unit cells moves down in the gravity direction. Accordingly, as illustrated in FIG. 12F, the position of the unit cell that outputs the minimum cell voltage moves down in the gravity direction. As described above, the processing of step S93e obtains the positions of the unit cells outputting the minimum cell voltage before and after the supply amount of the fuel gas is increased, and determines whether or not the position of the unit cell obtained after the increasing of the supply amount of the fuel gas is lower than that of the unit cell obtained before the increasing of the supply amount of the fuel gas in the gravity direction. In the example illustrated in FIG. 12C and FIG. 12F, the unit cell that outputs the minimum cell voltage changes from the unit cell 10-4 to the unit cell 10-6. In another manner, a sensor for detecting the temperatures of the unit cells is used to determine whether the leakage exists. It is determined that the leakage exists when the supply amount of the fuel gas or the oxidant gas is increased and the position of the unit cell having the highest temperature moves down in the gravity direction.

Instead of step S91b, the supply amount of the oxidant gas may be increased. It may also be determined that the leakage exists in addition to an affirmative determination made in step S93e, when the increasing amount of the pressure in the cooling water flow path 16 is more than the threshold value as with step S93b. It may also be determined that the leakage exists in addition to an affirmative determination made in step S93e, when the decreasing amount of the pressure in the fuel gas flow path 12 is more than the threshold value.

Although some embodiments of the present disclosure have been described in detail, the present disclosure is not limited to the specific embodiments but may be varied or changed within the scope of the present disclosure as claimed.

What is claimed is:

1. A fuel cell system comprising:
  a fuel cell stack including:
    a stacked body in which unit cells are stacked, the unit cells including first and second unit cells, the first unit cell being located on a first end of the stacked body, the second unit cell being located on a second end of the stacked body, the first unit cell being located above the second unit cell in a gravity direction;
    a reactant gas flow path formed in the stacked body; and
    a cooling water flow path formed in the stacked body, and extending from the second end to the first end and extending again to the second end;
  a pump that supplies cooling water to the cooling water flow path;
  a supply device that supplies reactant gas to the reactant gas flow path; and
  a control device configured to include:
    a bubble detection portion configured to detect an accumulation of bubbles in the cooling water flow path; and
    a cause determination portion configured to determine whether or not the accumulation of bubbles is caused by leakage of the reactant gas from the reactant gas flow path, when the bubble detection portion detects the accumulation of bubbles.

2. The fuel cell system of claim 1, further comprising:
  a removal device configured to remove accumulated bubbles from the cooling water flow path, when it is determined that the accumulation of bubbles is not caused by the leakage of the reactant gas from the reactant gas flow path.

3. The fuel cell system of claim 2, wherein the removal device includes the pump that discharges bubbles from the cooling water flow path by increasing and decreasing a rotating speed of the pump.

4. The fuel cell system of claim 1, further comprising:
  a warning device configured to issue a warning when it is determined that the accumulation of bubbles is caused by the leakage of the reactant gas from the reactant gas flow path.

5. The fuel cell system of claim 1, wherein in a state where the pump is stopped and the supply device is supplying the reactant gas to the reactant gas flow path, the cause determination portion is configured to determine that the accumulation of bubbles is caused by the leakage of the reactant gas from the reactant gas flow path, when an increasing amount of pressure in the cooling water flow path is not less than a predetermined value.

6. The fuel cell system of claim 1, wherein in a state where the pump is stopped and the supply device is supplying the reactant gas to the reactant gas flow path, the cause determination portion is configured to determine that the accumulation of bubbles is caused by the leakage of the reactant gas from the reactant gas flow path, when a decreasing amount of pressure in the reactant gas flow path is not more than a predetermined value.

7. The fuel cell system of claim 1, wherein the cause determination portion is configured to determine that the accumulation of bubbles is caused by the leakage of the reactant gas from the reactant gas flow path, when the supply device increases a supply amount of reactant gas to the reactant gas flow path, and thus a position of one of the unit cells that has a minimum cell voltage among the unit cells moves down in the gravity direction.

8. The fuel cell system of claim 1, wherein the cause determination portion is configured to determine that the accumulation of bubbles is caused by the leakage of the reactant gas from the reactant gas flow path, when the supply device increases a supply amount of reactant gas to the reactant gas flow path, and thus a position of one of the unit cells that has a highest temperature among the unit cells thus moves down in the gravity direction.

* * * * *

UNITED STATES PATENT AND TRADEMARK OFFICE
CERTIFICATE OF CORRECTION

PATENT NO. : 10,756,360 B2  
APPLICATION NO. : 16/253890  
DATED : August 25, 2020  
INVENTOR(S) : Hideyuki Kumei and Norihiko Haraikawa Page 1 of 1

It is certified that error appears in the above-identified patent and that said Letters Patent is hereby corrected as shown below:

On the Title Page

Item (72), inventor 1, city, delete "Shizuoka-ken" and insert --Sunto-gun Shizuoka-ken--, therefor.

Item (72), inventor 2, city, delete "Mishima" and insert --Mishima-shi Shizuoka-ken--, therefor.

In the Drawings

In drawing sheet(s) 8 of 12, figure 8B, block S91b, delete "AMOUT" and insert --AMOUNT--, therefor.

In drawing sheet(s) 11 of 12, figure 11B, block S91b, delete "AMOUT" and insert --AMOUNT--, therefor.

In the Specification

In Column 2, Line(s) 47, delete "FIG. 41" and insert --FIG. 4B--, therefor.

In Column 12, Line(s) 56, delete "step 855" and insert --step S55--, therefor.

In Column 16, Line(s) 28, delete "pathcomp" and insert --path--, therefor.

Signed and Sealed this  
Twelfth Day of January, 2021

Andrei Iancu  
*Director of the United States Patent and Trademark Office*